Patented Apr. 21, 1942

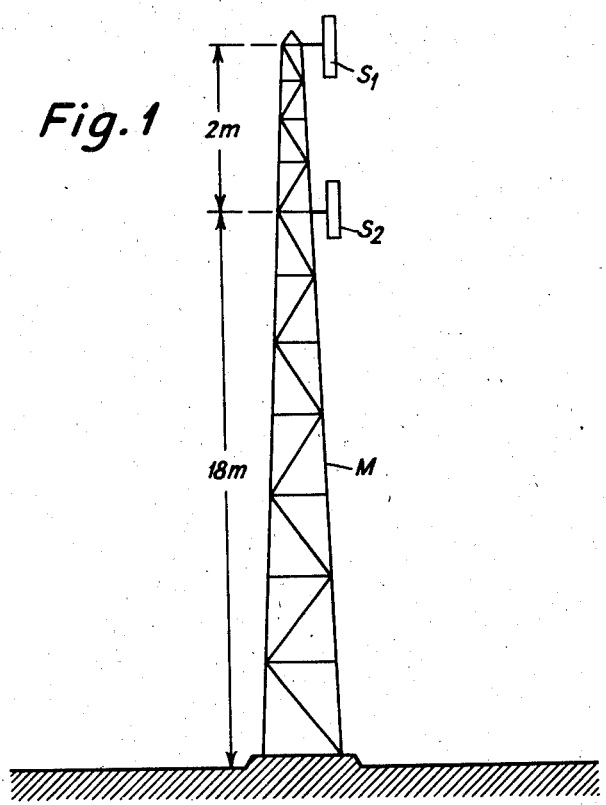
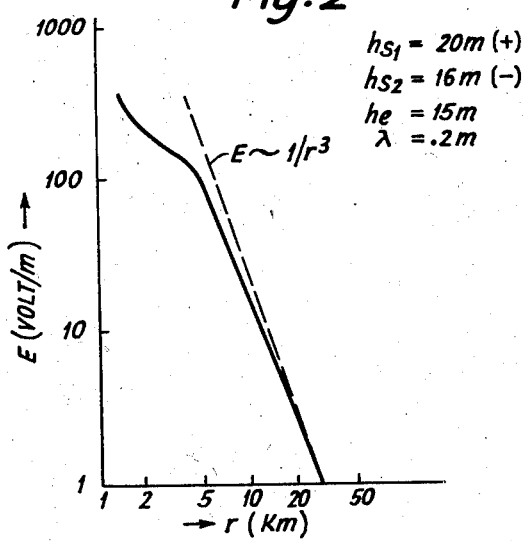

2,280,235

UNITED STATES PATENT OFFICE 2,280,235

ANTENNA

Waldemar Ilberg, Berlin, Germany, assignor to Telefunken Gesellschaft für Drahtlose Telegraphie m. b. H., Berlin, Germany, a corporation of Germany Application April 12, 1941, Serial No. 388,210
In Germany August 16, 1939

8 Claims. (Cl. 250—33)

This invention is concerned with antennae adapted to the transmission of ultra-short waves, more particularly when the terrain or areas over which the waves are to be sent are highly reflective in nature such as swampy ground, seas or oceans, etc. Theoretical considerations demonstrate that the incoming signal intensity E, in signal transmission by the aid of ultra-short waves, because of the image of the sending or the receiving antenna set up on the ground, is given by the following formula:

$$E = K \cdot \frac{1}{r} \sin\left(\frac{2\pi h_s h_e}{r\lambda}\right)$$

where K is a factor of proportionality, $r$ the distance of the sending and the receiving equipment, $h_s$ and $h_e$, respectively, the height of the sending and the receiving aerials above the reflecting ground, and where $\lambda$ stands for the length of the working wave. In order that the sight range may be made as large as possible, $h_s$ and $h_e$ are chosen relatively great (about 20 meters). This expression shows that the incoming signal intensity may be expected to be zero whenever the argument of the sine term is $\pi$ or a multiple thereof. Hence, the shorter the wave, the greater will be the value of $r$, with otherwise unchanged conditions, at which the argument of the sine expression will become $\pi$ or a multiple thereof, with an incidental impairment of the chances or possibilities of reception. It is this situation and phenomenon which is responsible for the fact that serious difficulties arise in the attempt to establish intelligence by means of decimeter waves over highly reflective ground, indeed, this difficulty will become particularly serious in case of signal transmission between ships on decimeter waves. The last zero place of reception which thus results will arise when the argument of the sine expression assumes the value $\pi$. This distance, under certain circumstances, may amount to several kilometers. For instance, if $h_s$ and $h_e$ are each assumed to be 20 meters, and if the operating wave be 20 centimeters, the last zero place of reception results for a distance of 4 kilometers. While, for greater distance, zero places will no longer arise greater numbers thereof will occur for lesser distances. In this way effective intelligence transmission may be impeded, it being over short distances that there exists the greatest interest to establish signal transmission and communication.

Now, it can be readily inferred from the above equation that, if the height of the sending and/or of the receiving antenna be chosen dissimilar, zero places of reception result at different distances. Calculation has shown that when at the sending and/or receiving points there are used, for signal transmission, a plurality of radiator systems, preferably two, mounted apart a distance which is also a multiple of the working wave, while the radiator systems, in turn, are disposed at a distance above the reflecting ground which is great compared with the distance separating them, zero reception positions will be discovered at the most at direct proximity to the sending apparatus. Thus the objection and difficulty cited above is obviated, namely, that zero reception zones or silent zones result for distances that otherwise should be considered for signaling. For practical conditions it may be expedient, to mount, for instance, two dipoles above each other at a distance of around 10 $\lambda$, while the distance from the reflecting ground is equal to about 100 $\lambda$.

An exemplified embodiment of the invention is shown in Figure 1. Figure 2 shows the relation of received signal to distance of the arrangement of Figure 1 with the dipoles connected in phase opposition. Mounted on a mast M are two radiator systems $S_1$ and $S_2$. Suppose the radiator systems are designed to work with a 20 centimeter wave. The upper radiator system shall be supposed to be disposed 20 meters above the reflecting ground and the lower radiator system at a distance of 18 meters above this ground. The station is assumed to be mounted on shipboard, in other words, it operates under conditions where the distance between the sending and the receiving stations is liable to assume widely different values. Instead of unitary radiators $S_1$ and $S_2$, it would, of course, also be possible to use multiple directional antenna systems or reflector systems. The invention may be employed in a similar way regardless of whether bunched or unbunched radiation is dealt with.

The feeding of the two radiator systems $S_1$ and $S_2$ is suitably in phase in respect to each other. However, in a great many instances it may be desirable to confine the radiation of the waves to a definite distance, say, for the reason not to interfere with or impair such signaling work as may proceed on similar working waves at greater distances.

To this end an arrangement similar to the one shown in Figure 1 may be employed in sending arrangements only with this distinction and difference that the radiators or radiator systems $S_1$ and $S_2$ are operated in phase opposition in respect to each other. As a result, if the distance is adequately great, the radiations sent out from the two radiators $S_1$ and $S_2$ will mutually neutralize and offset, this occurring particularly where the power with which the higher radiator system $S_1$ is operated is chosen less than the power with which the radiator system situated at a lower point is fed. For the above formula goes to show that, when $r$ is great, the receiving energy is proportional to the height of the radiator system above the reflecting ground or soil. In other words, with a view to insuring the before-mentioned purpose and aim, namely, to obtain extinction over greater distances, to operate the lower radiator system with greater power For similar reasons it may be expedient to use receiving aerials which are connected in phase opposition with the receiver apparatus in order that interference from greater distances may be precluded. The above-mentioned effect, namely, freedom from zero or silent zones causing disturbance in signaling work, at smaller distances will arise also in this arrangement.

Figure 2 illustrates the situation of reception in graphic form such as result from the use of radiator systems fed in phase opposition (push-pull). The calculation also here is based upon a working wave of 20 centimeters, the dipole receivers being mounted 16 and 20 meters, respectively, above the ground. Owing to the opposite action of the radiator antennae, the signal intensity that comes in diminishes with the third power of the distance.

While in what precedes mention is made of an arrangement in which the radiator systems are placed above one another or in superposed relationship, it will be understood that this does not necessarily mean that they must be mounted mechanically on one and the same mast structure; in fact, superposed mounting is meant in the sense of equal distance to the receiving point. In other words, superposed arrangement in the sense of the invention is always present whenever the distance to the receiving point is practically the same.

I claim:

1. An antenna arrangement adapted to operate with decimeter radiant energy waves including a plurality of radiator systems in superposed relationship spaced apart a distance equal to a multiple of the wavelength, said systems being mounted above ground a distance equal to a large multiple of the spacing between said systems, said radiator systems being energized in an opposing phase relationship.

2. An antenna arrangement adapted to operate with decimeter radiant energy waves including a plurality of radiator systems spaced vertically one above the other a distance equal to a multiple of the wavelength, said systems being mounted above ground a distance equal to a large multiple of the spacing between said systems, said systems being energized in an opposing phase relationship.

3. An antenna arrangement adapted to operate with decimeter radiant energy waves including a plurality of radiator systems in superposed relationship spaced apart a distance equal to a multiple of the wavelength, said systems being mounted above ground a distance of the order of ten times the spacing between the systems, said radiator systems being energized in an opposing phase relationship.

4. An antenna arrangement adapted to operate with decimeter radiant energy waves including a plurality of radiator systems spaced vertically one above the other a distance equal to a multiple of the wavelength, said systems being mounted above ground a distance of the order of ten times the spacing between the systems, said radiator systems being energized in an opposing phase relationship.

5. An antenna arrangement adapted to operate with radiant energy waves of such wavelength that their range is generally confined to the visual horizon including a plurality of radiator systems in superposed relationship spaced apart a distance equal to a multiple of the wavelength, said systems being mounted above ground a distance equal to a large multiple of the spacing between said systems, said radiator systems being energized in an opposing phase relationship.

6. An antenna arrangement adapted to operate with radiant energy waves of such wavelength that their range is generally confined to the visual horizon including a plurality of radiator systems spaced vertically one above the other a distance equal to a multiple of the wavelength, said systems being mounted above ground a distance equal to a large multiple of the spacing between said systems, said systems being energized in an opposing phase relationship.

7. An antenna arrangement adapted to operate with radiant energy waves of such wavelength that their range is generally confined to the visual horizon including a plurality of radiator systems in superposed relationship spaced apart a distance equal to a multiple of the wavelength, said systems being mounted above ground a distance of the order of ten times the spacing between the systems, said radiator systems being energized in an opposing phase relationship.

8. An antenna arrangement adapted to operate with radiant energy waves of such wavelength that their range is generally confined to the visual horizon including a plurality of radiator systems spaced vertically one above the other a distance equal to a multiple of the wavelength, said systems being mounted above ground a distance of the order of ten times the spacing between the systems, said radiator systems being energized in an opposing phase relationship.

WALDEMAR ILBERG.